No. 886,037. PATENTED APR. 28, 1908.
C. H. CALDWELL.
CHART FOR MUSIC STUDENTS.
APPLICATION FILED APR. 11, 1907.
3 SHEETS—SHEET 1.
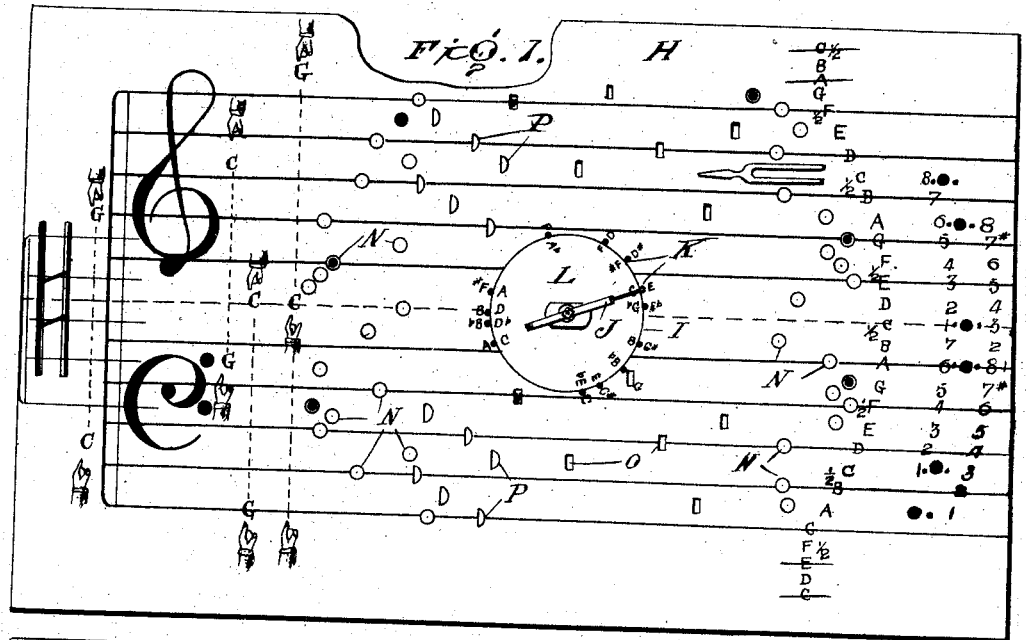
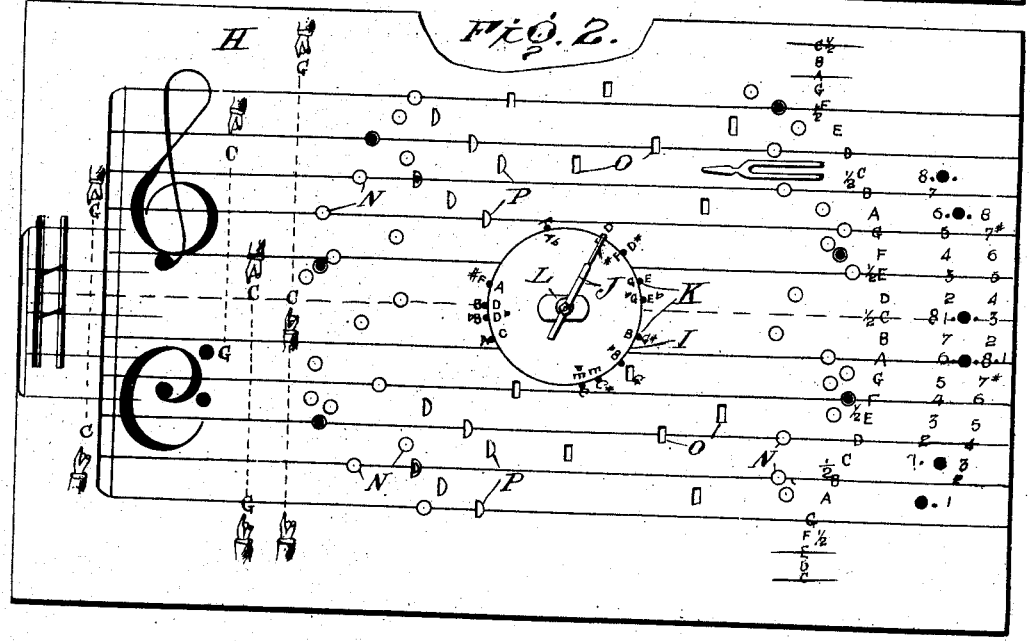
Witnesses
Inventor
C. H. Caldwell
By
Attorneys No. 886,037. PATENTED APR. 28, 1908.
C. H. CALDWELL.
CHART FOR MUSIC STUDENTS.
APPLICATION FILED APR. 11, 1907.
3 SHEETS—SHEET 2.
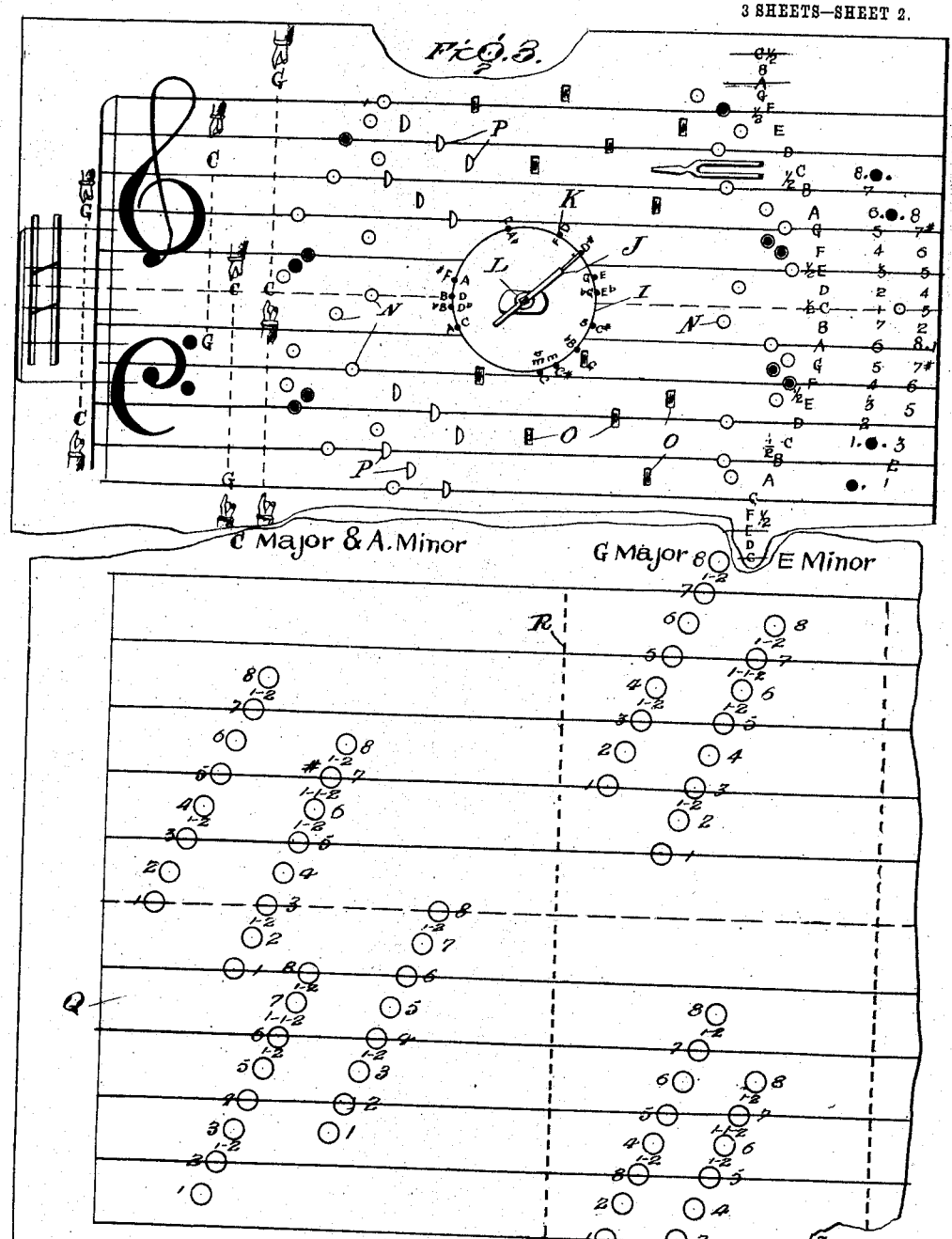

No. 886,037. PATENTED APR. 28, 1908.
C. H. CALDWELL.
CHART FOR MUSIC STUDENTS.
APPLICATION FILED APR. 11, 1907.
3 SHEETS—SHEET 3.
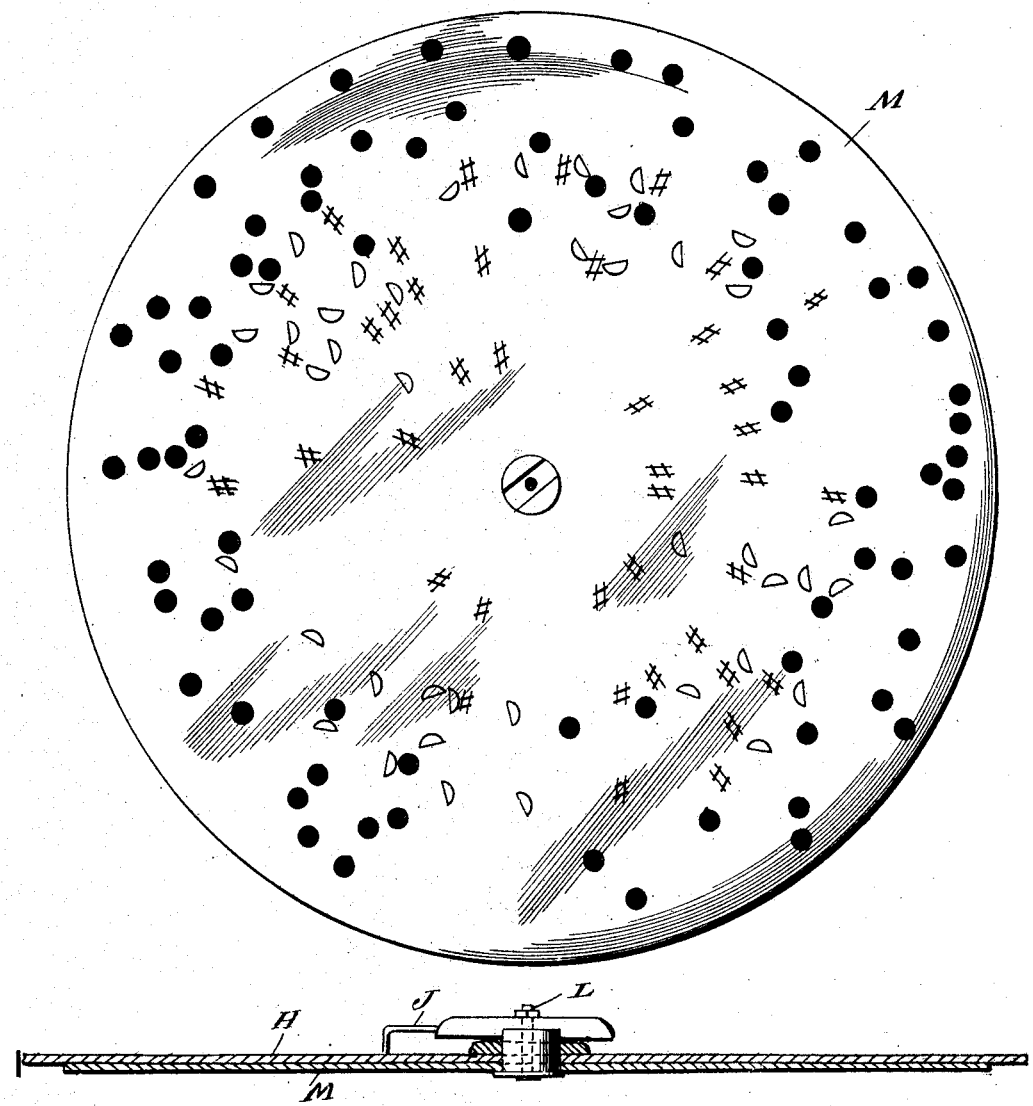

UNITED STATES PATENT OFFICE.

CHARLES H. CALDWELL, OF SEATTLE, WASHINGTON.

CHART FOR MUSIC STUDENTS.

No. 886,037.　　　　Specification of Letters Patent.　　　　Patented April 28, 1908.

Application filed April 11, 1907. Serial No. 367,621.

*To all whom it may concern:*

Be it known that I, CHARLES H. CALDWELL, citizen of the United States, residing at Seattle, in the county of King and State of Washington, have invented certain new and useful Improvements in Charts for Music Students, of which the following is a specification.

This invention has for its object an improved construction of transportation and notation chart for use in teaching vocal and instrumental music, and it is particularly designed as a valuable adjunct for teaching sight reading for both vocalists and instrumental players.

The aim of the invention is to provide means which will render the study of music interesting and simple and which will enable beginners as well as more advanced students to very readily read at sight as well as transpose from one key to another.

With these and other objects in view as will more fully appear as the description proceeds, the invention consists in certain constructions and arrangements of the parts which I shall hereinafter specifically describe and then point out the novel features in the appended claims.

For a full description of the invention and the merits thereof and also to acquire a knowledge of the details of construction of the means for effecting the result, reference is to be had to the following description and accompanying drawings, in which:

Figure 1 is a face view of my improved chart, illustrating the parts in one position; Figs. 2 and 3 are similar views with the parts in different positions; Fig. 4 is a face view of the indicator disk, on an enlarged scale; Fig. 5 is a transverse sectional view through the chart; and, Fig. 6 is a view of a portion of a sheet which is designed to accompany the chart, and which will be hereinafter specifically referred to.

Corresponding and like parts are referred to in the following description and indicated in all the views of the drawings by the same reference characters.

My improved transposition and notation chart embodies a sheet H which may be composed of linen, heavy card-board, or the like, if it be desired to roll the chart, or of any stiff material. The sheet H displays two clefs, with their signatures at the left hand end and it also displays between the bass and treble signatures, a tenor signature. To the right of the treble and bass signatures are vertically extending dotted lines of a length to indicate the various compasses of the different male and female voices. For instance, one of these dotted lines extends from upper "G" natural to middle "C" and indicates the ordinary soprano compass. The same line extends downwardly so that in its entirety it will reach from upper "G" to lower "G" in the bass clef to indicate the ordinary full compass or range of the human voice. To the left of the line just described, there is another line which indicates the usual compass of the bass or barytone voice, extending from middle "C" to lower "G" in the bass clef, and to the left of this last mentioned line there is another line extending from middle "G" in the bass clef, which is the "G" below the treble clef, to upper "C" in the treble clef, indicating the usual compass of the contralto voice. At the right of the tenor sign or signature and between such sign and the signs for the bass and treble clefs, is another line indicating the ordinary compass of a tenor voice, such line extending from lower "C" to middle "G" in the treble clef. Each of these lines preferably terminates with the letter which is displayed on the chart to indicate the key or tone at the limits of the different voices. There may also be displayed hands pointing towards each other merely as devices to call attention more sharply to this portion of the device. At the opposite end of the sheet H is a series of letters "C", "D", "E", "F", "G", "A", "B", and "C", displayed at the proper intervals or degrees on the two clefs and above and below the same to indicate the different key tones which they represent, and in the present instance, these letters are duplicated so as to extend through four complete octaves from "C", below the bass clef to high "C", as clearly illustrated in the drawings. Between every "E" and "F", and "B" and "C" and offset slightly therefrom is the designation "½" indicating a half step up, or a half step down, according to the different keys or scales, and the particular function of these fractional designations or their specific application, will be set forth hereinafter when the operation of the entire device is described. Still farther to the right, the sheet H will be seen to display numerals or digits from one to eight in substantially vertical series, the numerals of these series being duplicated as shown and being placed in juxtaposition to two scales of "C" in the grand staff. Still farther to the right is a small series of digits which commence at "A" instead of "C", indicating the relative diatonic minor scale, of the major scale of "C". In this last named series, it will be seen that the sharp signature is located to the right of the seventh key in the scale, indicating that "G" is sharped or raised one-half tone in running the minor scale which is relative to "C" major.

The middle of the sheet H displays a circle around which are arranged letters designating the different major scales and their relative minors, the letters designating the different major scales being located within the circle, while their relative minors are arranged in radial alinement just outside of the circle as shown, and it is within the purview of my invention to make the major scale notations and signatures of contrasting color to the minor keys and scale signs, although my invention is not limited to the contrasting color scheme. It will be understood, however, that if desired, the tonic keys and other signatures of the different major scales, together with all of the scales of the chart hereinafter referred to may be, for instance, black and the relative indicia for the minor mode may be red.

Within the circle I is a pointer J with a bent extremity adapted to register with small dots located between the key notation of each scale and its relative minor and said pointer is carried on the axis L upon which the revoluble disk M is mounted. This disk is mounted to revolve over the rear face of the sheet H and contains, in predetermined arrangement, forty dots which may be of one color as they are intended to refer to the major mode, and forty dots which may be of a contrasting color, as they are intended to refer to the minor mode, forty-two sharp signs, and forty-two flat signs.

The sheet H itself is formed with a plurality of circular openings through which the said dots are adapted to show, with twelve openings N, with twelve oblong openings O through which the sharp signatures are adapted to show through, and with twelve crescent shaped openings P through which the flat signatures are adapted to show, as the disk M is turned. The disk is turned by means of the finger piece which directly carries the pointer J. Manifestly the particular arrangement of the dots and signatures on the disk M, and the openings N, O and P, formed in the sheet H bear a definite relation to the letters and numerals displayed on the right hand portion of the sheet, and I shall now describe the operation of the apparatus, giving a sufficient number of examples to indicate the correlation between the disk and the sheet and illustrating how the manipulation of the device will assist in reading at sight and in the transposition of all the different keys to the grand staff, or from one scale to another.

Starting with what is perhaps the most simple scale next to the scale of "C" major, namely, the scale of "G" major, it will be seen that if the pointer J is turned until its end registers with the dot on the circle I between the key-tone designations "G" and "E", then the disk which moves with the pointer will be so turned as to bring a dot "G" wherever it occurs in the clefs. The student will thus observe that there are three dots showing through the circular openings on the same letters in the grand staff corresponding in name to the letter inside of the circle I, as indicated by the finger, and it is understood that there are four key notes in each scale and the corresponding letter below the lower dot is the fourth key note. When the disk is in the same position, it will be noted that to the left of the circle and pointer, other dots show through which are in line with the minor key of "E". It will thus be seen that when the pointer is turned to "G" and "E" at the circle or dial, the chart will indicate, in connection with the letters to the right of the dots showing through, the major scale of "G" and what is its relative minor scale, namely, "E". The same is true of all the scales throughout the transposition of the grand staff. Hence, the scales can be exhibited one at a time very quickly and thereby avoid all complication in scale practice and enable the student to readily comprehend the intricacies of sight reading and transposition.

As a second example, reference is to be had to Fig. 2, where it will be seen that the pointer J stands at scales of "F" major, and "D" minor, and in this position of the parts, a dot will show through at the points "F" at the right hand side of the scale showing the scale of "F" major and dots will also appear at the left hand side of the chart to indicate the scale of "D" minor. As a third example, if the pointer be turned to stand at "F" sharp, "D" sharp, the same key tones will be observed, except that two dots will show, one slightly above and offset from the other, indicating that the natural tone of "F" must be raised a half degree. The same display will be made if the pointer be turned to stand at "G" flat, "E" flat, except that the two dots will show at "G" and at the offset opening near "G", this being true because, as is well known, the key of "F" sharp is substantially similar to the key of "G" flat.

It is proposed to provide a tuning fork to go with each chart, said fork being standard American "C" pitch, so that by the use of my invention a singer may transpose to any key and sing any selection in the key that is preferred, according to the range of voice. In connection with the chart itself, I propose to employ a set of especially prepared sheets or list of scales, a specimen of which is illustrated in Fig. 6, and designated Q. Each of these sheets displays a list or succession of all the scales both major and minor produced by sharping and flatting certain lines or degrees of the staff in which are embodied all the divisions that are designated keys or scales. It will be seen that the sheet Q is so arranged that its lines will match the lines of the chart and it is evident that when they are so matched end to end, the scale of "C" major and "A" minor written or indicated on the sheet will correspond to those printed on the chart. If the sheet be rolled along or turned back to the first vertical or dotted line R and again matched to the chart and if the center disk M be then turned until the indicator stands at "G", "E", indicating the major scale of "G", and its relative minor "E", it will be seen that all the key notes on the chart will correspond with the scales of "G" major and "E" minor as written out on the sheet Q. These are taken as examples and the same is true of all the scales throughout the transposition of all the keys of grand staff. I propose to have a series of these sheets Q, one being the scale sheet and the other ones will contain instructions together with four-part compositions in each of the different scales for practice in note singing, thereby rendering the accomplishment of note singing at sight comparatively easy and of quick comprehension and capable of being mastered in a very short time. Any mechanical contrivance may be used to roll or pass these sheets in juxtaposition to the chart.

From the foregoing description in connection with the accompanying drawings, it will be seen that I have provided a very simple chart in which all of the different scales, both in the major and minor modes may be displayed and serve as means for quickly imparting to a student, either a beginner or advanced, a knowledge of the fundamentals of musical composition and also efficient instructions in the art of sight reading and transposition.

Having thus described the invention, what is claimed as new is:

1. A chart of the character described, consisting of a sheet containing indicia designating clefs and letters designating the different keys of the grand clef, said sheet being formed with a series of circular openings, a series of oblong openings, and a series of crescent shaped openings and being provided at its middle with a circularly arranged series of letters and signatures designating the different major scales and their relative minors, and a disk mounted to revolve over the rear surface of said sheet and provided in its surface with dots, and sharp and flat signs, said dots and signs being adapted to be displayed through the various openings of the sheet, and a pointer mounted to turn with said disk at the middle of the sheet around within the series of letters that designate the different scales, the relation between the indicia on the disk, the various openings in the sheet, said pointer, and said scale denoting letters being such that the dots and scale signs will show through on the clefs at the proper points to designate the different keys, according to the position of the pointer with respect to the scale denoting characters of said different keys.

2. A chart of the character described, consisting of a sheet containing indicia designating clefs and letters designating the different keys of the grand clef, said sheet being formed with a series of circular openings, a series of oblong openings, and a series of crescent shaped openings and being provided at its middle with a circularly arranged series of letters and signatures designating the different major scales and their relative minors, and a disk mounted to revolve over the rear surface of said sheet and provided in its surface with dots, and sharp and flat signs, said dots and signs being adapted to be displayed through the various openings of the sheet, and a pointer mounted to turn in said disk at the middle of the sheet around within the series of letters that designate the different scales, the relation between the indicia on the disk, the various openings in the sheet, said pointer, and said scale denoting letters being such that the dots and scale signs will show through on the clefs at the proper points to designate the different keys, according to the position of the pointer with respect to the scale denoting characters of said different keys, the sheet also displaying digits arranged alongside of the letters denoting the grand clef, said digits ranging from one to eight and corresponding to the relative positions of the different keys in an octave.

3. A chart of the character described, consisting of a sheet containing indicia designating clefs and letters designating the different keys of the grand clef, said sheet being formed with a series of circular openings, a series of oblong openings, and a series of crescent shaped openings and being provided at its middle with a circularly arranged series of letters and signatures designating the different major scales and their relative minors, and a disk mounted to revolve over the rear surface of said sheet and provided in its surface with dots, and sharp and flat signs, said dots and signs being adapted to be displayed through the various openings of the sheet, and a pointer mounted to turn in said disk at the middle of the sheet around within the series of letters that designate the different scales, the relation between the indicia on the disk, the various openings in the sheet, said pointer, and said scale denoting letters being such that the dots and scale signs will show through on the clefs at the proper points to designate the different keys, according to the position of the pointer with respect to the scale denoting characters of said different keys, the sheet also displaying at intervals the fraction "$\frac{1}{2}$," and the circular openings being arranged so as to display the dots of the disk at points in juxtaposition to the fractional designations, for those keys requiring a rise or fall of one-half tone from the natural pitch, in the scale.

In testimony whereof I affix my signature in presence of two witnesses.

CHARLES H. CALDWELL. [L. S.]

Witnesses:
  J. V. BOYD,
  DANIEL LANDON.